United States Patent Office 2,942,741
Patented June 28, 1960

2,942,741
FLOW CONTROL SYSTEM FOR PARTICULATE MATERIAL

Milton A. Ausman, Richmond, Calif., assignor to California Research Corporation, San Francisco, Calif., a corporation of Delaware Filed Feb. 1, 1954, Ser. No. 407,555

4 Claims. (Cl. 214—17)

The present invention relates to flow control systems for solid particulate material, more particularly to flow control systems wherein the solid particulate material flows in a closed path, and has for an object the provision of a control system for automatically maintaining the rate of flow of solid particulate material at a predetermined value in response to the passage of randomly-spaced radioactive particles flowing with the bulk of said solid particulate material.

There is disclosed in patent application Serial No. 320,367, filed November 14, 1952, now abandoned, in favor of their continuation-in-part patent application Serial No. 610,685, filed September 18, 1956, by Donald E. Hull and Clayton S. Huey, assignors to the assignee of the present invention, a method of controlling the rate of flow of solid particulate material in a closed flow path by the incorporation therein of an exceedingly small number of radioactive particles, each having substantially the same density and volume as the large bulk of solid particles. The presence of these particles permits accurate measurement of the rate of flow of such materials without the necessity of weighing representative volumes of the material, as required in practice prior to the said Hull and Huey application. As disclosed further in said application, the rate of flow of the solid particulate material is measured by positioning at least a pair of radiation detectors at spaced locations along a portion of the flow path for the material. By timing the particle passage between said locations, the rate of flow of the material may be determined, since the volume of the flow path between said locations is a known constant.

As taught in the Hull and Huey application, a minute number of radioactive particles are incorporated in the bulk of particles to measure the rate of flow of said bulk. As further taught therein, it is desirable to radioactivate representative particles having generally the same mass as the majority of the particles in order to insure random spacing of the radioactive particles in the system.

In practice, it has been found that these radioactive particles are subject to attrition and breakage, as are the other particulate materials of the system and, accordingly, portions abraded or fractured away from the orginal radioactive particles will not flow at the same rate and be representative of the rate of flow of the bulk of the material. While these particles flowing at a non-representative rate may be readily recognized by visual inspection of a recorder chart, random signals generated at either the first or second location by these non-representative particles present a difficult problem in utilizing the measurements for applying automatic control of a final control element capable of regulating flow of material in the system.

In accordance with the present invention, provision is made for recognizing only those radioactive particles which represent the bulk of solid particulate material whose flow rate is to be controlled. In a preferred form of apparatus for carrying out the invention, the controller in general comprises means responsive to the passage of a radioactive particle at the first of two spaced locations to initiate a time cycle. Terminating means are provided for stopping said timing cycle when said timing cycle is unacceptable as a true measurement by being less than or exceeding a normal control cycle representative of the established outer limits or control band for the rate of flow of the solid particulate material. Memory circuit means, responsive to the direction of variation of the timing control cycle from the established value to be maintained by the control system, are operable in response to the passage of a representative radioactive particle at the second of the spaced radiation detecting means, when said radioactive particle traverses the flow path between said first and second detecting means within the normal control cycle. Further, in accordance with the invention, the final control element for varying the flow rate of the particulate material is responsive to the information stored in the respective memory units, provided a compensatory effect in direction and time, as dictated by said memory units, is required to maintain the particulate flow rate within the established limits. The direction of movement of said final control element is made to return automatically the controlled variable, the rate of flow, to the established control point.

Further objects and advantages of the present invention will become apparent from the following detailed description taken in conjunction with the accompanying drawings which form an integral part of the present application.

Figure 1:
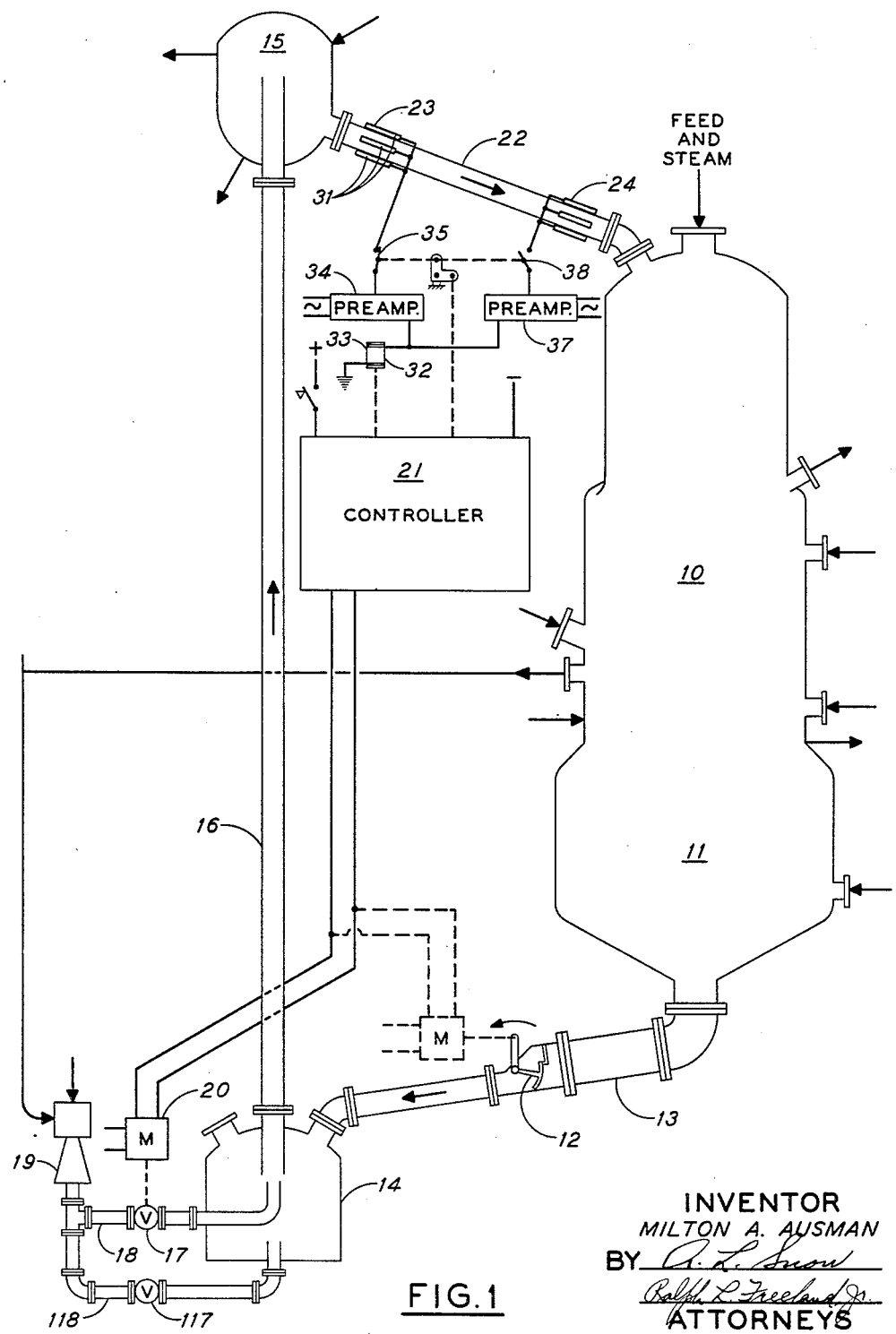
Fig. 1 is a schematic representation of a flow control system for automatically maintaining at a predeterminable value the rate of flow of solid particulate material through a closed flow path and illustrates the present invention as applied to a catalytic cracking system, wherein the catalyst material is continuously recirculated between a reaction zone and a regeneration zone.

Referring now to the drawings, and in particular to Fig. 1, there is illustrated therein the application of the automatic control system of the present invention for regulating the flow of solid particulate catalyst material through a catalytic reaction system of the type disclosed in detail in the aforementioned application of Hull and Huey. In the particular arrangement shown in Fig. 1, catalyst particles are reacted with hydrocarbons and steam at an elevated temperature in a reaction vessel, designated generally as 10. In this type of system the residence time of the solid particulate catalyst material in vessel 10 determines the efficiency of the chemical reaction, heat for which is supplied by burning of the coke formed on the catalyst bead which likewise provides regeneration of the catalyst in lower portion 11 of vessel 10.

In order to maintain both the catalytic regeneration and reaction at optimum efficiency, it is highly desirable that a constant rate of flow for the catalyst particle through the system be maintained at all times. In general, this rate of flow may be controlled by the opening and closing of chopper valve 12 located in a return leg, or tubing, 13. Alternatively, and preferably, as illustrated in the arrangement of Fig. 1, control of the rate of flow is provided by the rate at which catalyst is transferred from the lower hopper 14 to the upper hopper 15 through lift conduit 16. In the present embodiment, this rate of lifting, and, consequently, the rate of flow of catalyst in the system, is controlled by the opening of valve 17 in line 18 which supplies compressed air from compressor 19 to the catalyst in the lift-engaging hopper 14. Accordingly, the final control element for the automatic control system of the present invention is provided by valve 17, which is arranged to be moved automatically in a compensatory direction to maintain the rate of flow of catalyst through the system at a constant rate by means of control motor 20. As shown in phantom, this control alternatively may be applied to chopper valve 12.

Automatic control of motor 20 and, accordingly, the opening of valve 17 is provided by controller 21 which is adapted, in accordance with the present invention, to measure the rate of flow of the solid particulate material by determining the rate of flow thereof through top seal leg 22, which feeds catalyst from lift-disengaging hopper 15 into the top of reaction vessel 10.

As particularly disclosed in said prior application of Hull and Huey, the rate of catalyst flow through the entire closed loop including vessel 10, bottom seal leg 13, hopper 14, lift conduit 16, hopper 15, and top seal leg 22 may be determined by the introduction of a very small number of radioactive particles of the same general size and mass as those of the majority of the particles flowing in the system. The presence of these radioactive particles is sensed by the positioning of a ring of detectors, such as Geiger-Mueller tubes, around the circumferences of top seal leg 22, as indicated generally at the spaced locations, designated as 23 and 24.

In actual practice, the top seal leg 22 may have a diameter of as much as two or three feet, while the particles passing therethrough may have a diameter of the order of a fraction of an inch; for example, one-quarter to one-half inch average diameter. Since it is desirable to maintain the radioactivity of even these few particles as low as possible, in order to eliminate radiation hazards in the operation of such a system, there is presented a serious problem in detecing at both locations 23 and 24 the passage of one of the small number of radioactive particles in a total of approximately one billion particles. Additionally, as mentioned above, the particles themselves are subjected to considerable attrition due to breakage and wear, which may result in particles of radioactivity being present in the flowing bulk of solid particles, but not traveling at substantially the same rate as the remainder of the particles.

For the foregoing reasons, the simple measurement of radioactivity with efficient detectors at locations 23 and 24 cannot be used directly. There is additionally required means for recognition of the cause of such radioactivity in order to determine whether, and in which direction, the final control element, such as valve 17, must be moved in order to maintain the rate of flow through the system at a substantially constant established value. In accordance with the present invention, such recognition is made possible by provision in controller 21 of means for measuring the time required for sequential radioactivity to be detected at locations 23 and 24, and means for comparison of that time with a value corresponding to the desired rate of flow.

Figure 2:
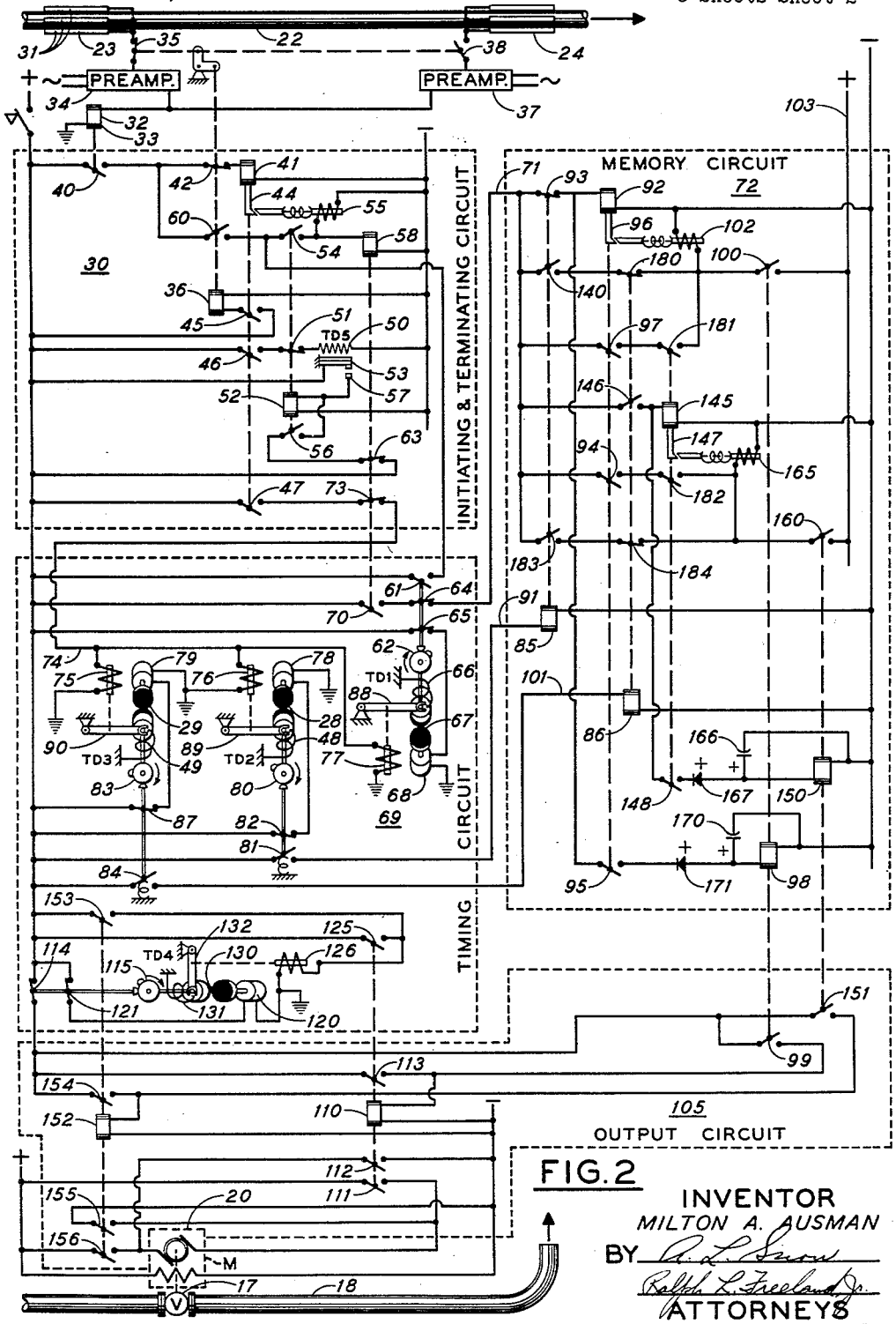
Fig. 2 is a schematic diagram of an electrical circuit for the control system embodying the present invention, as particularly applied to the flow system illustrated in Fig. 1.

In carrying out this objective, there is provided an initiating circuit means, designated generally as 30, particularly shown in Fig. 2, which is activated by the passage of a radioactive particle detected at location 23 by a ring of Geiger tubes 31 arranged to energize coil 32 of initiating relay 33 through preamplifier 34. As shown, preamplifier 34 is connected to the ring of Geiger tubes 31 through a normally-closed contact 35 of transfer relay 36. Thus, operation of the initiating and terminating circuit 39 is controlled by the closure of contact 40 of relay 33 in response to the passage of a radioactive particle at location 23 of pipe 22. Contact 40 of relay 33 supplies power to the coil of relay 41 through normally-closed contact 42 of relay 36 by the momentary closing of contact 40. As will be described more fully hereinafter, the closing of contact 40 not only initiates the timing cycle but also serves at a later time to terminate the cycle. After actuation, relay 41 is held closed mechanically by a latching mechanism indicated generally as 44, and it is the closing of contacts 45, 46 and 47 of relay 41 which provides the initiating circuit for the start of the measured time cycle which is compared to a desired predetermined value. Contact 45 provides a holding circuit for the coil of relay 36 in order to transfer the operation of coil 32 of relay 33 from the radiation detected at location 23 so that it is prepared to receive signals subsequently originating at the second spaced location 24. As illustrated, this is accomplished by the opening of contact 35 and the closing of contact 38 by the energization of selection relay 36.

In order to prevent erroneous response to radiation detected sequentially at locations 23 and 24, there are provided terminating circuit means for shorter and longer intervals of time than a predeterminable band of control times lying within what may be termed a "normal range" of control values lying on opposite sides of the predetermined value. This "normal range" defines a control band width which may have a preselectable value in the circuits to be described hereinafter by adjustment of the several timing means identified as TD–1, TD–2, TD–3 and TD–5. The relationships of these timing cycles is particularly illustrated in Fig. 3. As there shown, each of the time cycles originates at time, $t=0$, and the above-defined "normal range" of control values will be seen to lie between the end of time cycle $t_4$, as controlled by TD–5, and the start of time cycle $t_1$, as determined by the operation of TD–1.

That portion of the terminating circuit means, identified as TD–5, which prevents response by the final control element to shorter intervals of time than the normal control range, is provided conveniently by a heater and bimetallic thermostat combination. In this combination the heater coil 50 is energized upon passage of a "marker" at location 23 by the closing of contact 46 of relay 41 and through normally-closed contact 51 of relay 52. A bimetallic strip 53 adjacent heater 50 is heated sufficiently in a predeterminable time, identified as $t_4$, to close a power circuit to the coil of relay 52. The closing of contact 54 by operation of relay 52 at the end of time cycle $t_4$, provides a control circuit which permits the energization of the coil of relay 58 when a radioactive bead passes location 24 to close again contact 40 of relay 32 and supply power to relay 52 through closed contact 60 of relay 36. Alternatively, relay 58 may be energized after the predeterminable time, identified as time cycle $t_1$ by the closing of contact 61, controlled by cam 62 in response to a timing-out of timer TD–1. This action of the timing means TD–1 is arranged in the present embodiment of the invention to occur after the predetermined interval of time $t_1$, which is longer than that of the previously-defined normal range of control values, due to failure of a radioactive particle to energize the detector at location 24.

In order to provide a better understanding of the time measuring circuits provided by timing circuit means, identified generally as 69, it will be helpful at this point in the explanation to describe the operation of the four timing devices identified as TD–1, TD–2, TD–3 and TD–4. These devices are preferably of the type disclosed in Anderson Patents 2,175,864 and 2,175,865. As described in these patents and illustrated schematically in Fig. 2, these timing devices, as specifically illustrated by TD–1, comprise a constant speed drive motor 68 connectable through a clutch 67 to drive cam 62 until it operates switch means 61, 64 and 65. In the present arrangements, the clutches 67, 28, 29 and 130, respectively, of the timing devices TD–1, TD–2, TD–3 and TD–4 are normally disengaged due to coil springs 66, 48, 49 and 131. These coil springs also provide a resetting mechanism for cams 62, 80, 83 and 115 due to the coil spring being arranged to be wound with the driven member of the clutches when they are engaged. Thus, upon disengagement of the clutches, the coil springs in the arrangements of TD-1, TD-2 and TD-3 serve to reset their respective cams 62, 80 and 83 by causing the driven clutch member to be returned to its illustrated position. Solenoids 77, 76 and 75 are energized upon passage of a marker at location 23, that is at time, $t=0$, by the closing of contact 47 to energize line 74 through normally-closed contact 73. Solenoids 77, 76 and 75 pivot, respectively, the lever members 88, 89 and 90 connected to the driven members of clutches 67, 28 and 29. The motor of each timing device is normally connected to a source of power through one of the cam-actuated switches and begins to drive the cam associated therewith through the clutch. The driving of the cam continues until either the cycle is interrupted by passage of a radioactive bead at position 24 or such time as the cam-operated switch opens the control circuit for the motor and stops the timing operation. In the event that a radioactive bead passes position 24 before timing device TD-1 times out, that is before the end of time cycle $t_1$, relay 58 is energized and opens its contact 73, thereby opening solenoids 77, 76 and 75 to permit the coil springs to reset each of the timing means TD-1, TD-2 and TD-3, respectively. One the other hand, if TD-1 times out at the end of time $t$, the same reset action occurs by the closing of switch 61 which energizes relay 58 through an auxiliary resetting circuit which includes contact 54. It will be seen that by adjustment of the cam positions, there is provided control of the length of the time cycle $t_1$, $t_2$, $t_3$ and $t_4$ for each of the timing devices.

Figure 3:
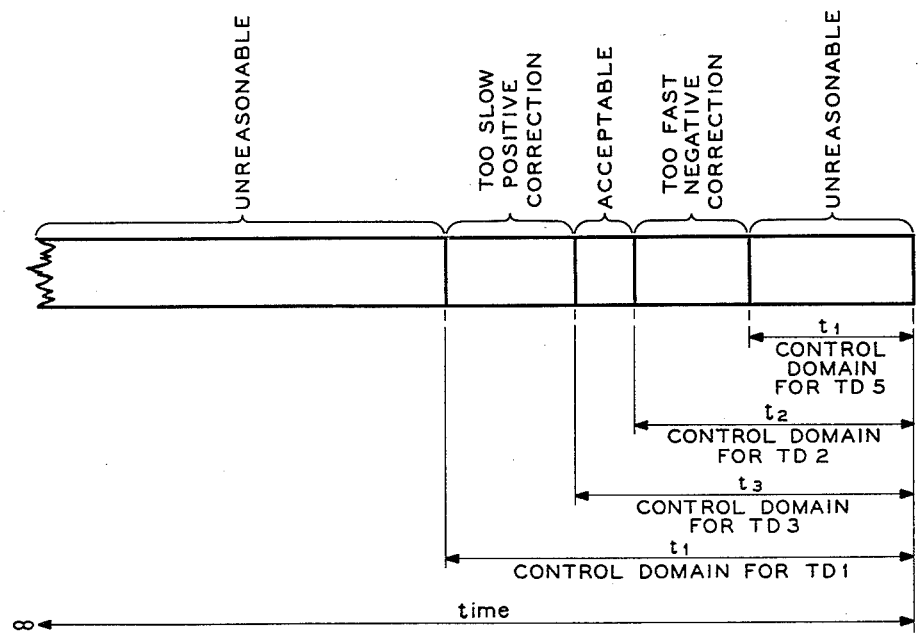
Fig. 3 is a chart of the interrelationships of the time cycles provided by the control system illustrated in Fig. 2, when said system is operated in a preferred manner for carrying out the present invention.

As mentioned above, relay 58 provides a master control means for determining the time required for passage of a radioactive particle between locations 23 and 24, when that time interval, see Fig. 3, is within the range of normal control values, as determined by the control band width, established by timing means TD-1 and TD-5. The control band values of time within which the rate of flow of material in conduit 22 can be controlled may, of course, be varied by adjustment of the time delays established by both TD-5 and TD-1. Passage of the radioactive particle in sequence between positions 23 and 24 within this preselectable time control band results in the closing of contact 70 of relay 58, thereby energizing line 71 to a memory circuit, identified generally as 72.

In the present embodiment, cam 80 of timer TD-2 controls the end of time $t_2$ and is adjusted to close normally-open contact 81 if contact 73 is not closed by relay 58 within a predetermined time interval which is less than the time interval corresponding to the predetermined value for the desired rate of flow in the system. Cam 83 of timer TD-3 controls the start of time $t_3$ and is adjusted to close its normally-open contact 84 after a predetermined time interval longer than that set for cam 80 of timer TD-2, so that upon a further elapse of time between the detection of the particle at 23 and its subsequent passage at 24, contact 84 will be closed. Thus, depending upon the time at which a subsequent passage of a radioactive bead closes contact 73 to reset timing means TD-2 and TD-3 in response to the passage of a bead at location 24, neither contact 81 nor 84 will be closed, contact 81 alone will be closed, or both contacts 81 and 84 will be closed. It will be noted that contacts 81 and 84, respectively, control the energization of relays 85 and 86 in memory circuit means 72.

While the time intervals measured by the timing circuit, resulting in the closing of contacts 81 and 84, may be used directly to control the operation of motor 20 to operate the final control element, valve 17, in the preferred embodiment, provision is made for delaying control of the valve 17 until after two successive measurements of the time interval required for passage of a radio-active particle between 23 and 24 have been taken, and then valve 17 is operated only in response to two successive measured time intervals, both of which lie on the same side of the set or control point. In the circuit shown in Fig. 2 this mode of control is provided by memory circuit 72 which operates in response to the order in which lines 71, 91 and 101 are energized.

In explanation as to the mode of operation of memory circuit 72 to control the direction of operation of motor 20, it will first be assumed that the time interval for passage of a radio-active particle between locations 23 and 24 is less than the set value for the desired rate of flow, as a result of a more rapid passage of the radioactive particle between the two locations. Under this condition, the timing circuit means are arranged to close contact 70 of relay 58 so that it will be closed to energize line 71 prior to the time that either cam 80 or 83, respectively, of timers TD-2 and TD-3 can operate to close contacts 81 or 84 to energize leads 91 or 101 to the memory circuit.

Under these circumstances, the coil of relay 92 is energized by a single pulse of current supplied by the momentary closure of contact 70 through the normally-closed contact 93 of relay 85 to actuate contacts 97, 94 and 95 of relay 92. Upon initial closing of relay 92, contacts 97, 94 and 95 are held closed by a mechanical interlock, designated generally as 96. Particularly, the closing of contact 95 conditions an energizing circuit for the coil or relay 98 which does not close during the same initial pulse that closes relay 85 due to rectifier 171 being in series with the coil of relay 98. Upon subsequent passage of a particle between locations 23 and 24 in another time interval less than the predetermined value, the circuit through contact 95 permits the coil of relay 98 to close its contact 99 and bring into operation relay 110, which controls the direction of rotation of motor 20 in manner to slow down the rate of flow of solid particulate material through the closed path of the system. The closing of relay 98 likewise provides a circuit for de-energizing the memory circuit relay 92 by closing a contact 100 connecting tripping relay 102 to the positive side of the supply source, line 103.

Under the foregoing conditions, with contact 99 of relay 98 closed and coil 110 energized, the adjustment of the position of the final control element, valve 17, is preferably made by a stepwise movement of predeterminable magnitude, as controlled by the timing means TD-4. This mode of operation is provided by permitting contacts 111 and 112 to remain closed a predeterminable time by connecting the coil of relay 110, after its initial closing, through a holding contact 113 which is energized through switch 114 controlled by the position of cam 115 of timing means TD-4. Timing motor 120 of TD-4 is energized through another cam-actuated switch 121 to time itself out and open both circuits through contacts 114 and 121. It will be observed that, under normal conditions, the contacts 114 and 121 are permitted to remain closed by cam 115. However, when corrective action is required for the system, contact 125 of relay 110 is closed to energize clutch coil 126 to engage clutch 130, which remains engaged until cam 115 is driven by motor 120 to a position such that contacts 114 and 121 open. The corrective action supplied by motor 20 to final control valve 17 is thus continued from the time contact 125 closes to engage clutch 130 until cam 115 is rotated to open contacts 114 and 121.

If it now be assumed that instead of the rate of flow through conduit 22 being faster than the desired value, the flow is slower, timing means TD-2 is arranged to drive cam 80 until it closes switch 81, which occurs prior to the time that a radioactive particle arrives at the second location along the conduit, that is, position 24. Upon closure of contact 81 by timing means TD-2, line 91 to the memory circuit 72 is energized and relay 85 operated to open switch contact 93 and at the same time close contacts 140 and 183. This operation prevents the energization of relay 92 in response to the passage of the radioactive particle and resets the latch 96 of that relay, by energizing the tripping relay 102, and thereby prevents operation of the relay 98 until after occurrence of another period of shorter duration. As stated before, the purpose of this arrangement is to prevent application of corrective action to the final control element until two successive time intervals have been measured for the passage of a radioactive particle between location 23 and location 24, both of which are less than the predetermined time required for the passage of a particle at 24 and both of which precede the interval of time required for timing means TD-2 to operate switch 81. Thus, it will be seen that the timing means TD-2 will in general establish the lower time limit for the control point about which the control variable, rate of flow, is adjusted. However, in accordance with the present arrangement, there is provided an effective dead zone, that is, a range of acceptable values for the controlled variable, in which there is effectively no control of the final control element. This, in general, is provided by the difference in the closing times for contact 81 and contact 84. This time is set by the difference in time required for cam 83, driven by timing means TD-3, to close contact 84 and the time required for TD-2 to close contact 81. Desirably, this "dead" zone of acceptable values is made relatively small so that, shortly after the closure of contact 81, contact 84 is closed to energize line 101, thereby operating relay 86 which controls the energization of memory circuit relay 145 to condition the output circuit means 105 for movement of the final control element in a direction to increase the rate of solid material flow through the system.

Memory relay 86 is provided with a contact 146 in the main control circuit of relay 145 which connects that relay to line 71 so that relay 145 may be energized, instead of relay 92, upon the occurrence of a radioactive particle at location 24, in the manner described hereinbefore. Relay 145 is also provided with a mechanical interlock 147 which holds contact 148 of relay 145 in a closed condition ready for the subsequent passage of another particle between locations 23 and 24 which is longer than the time value corresponding to the desired rate of flow.

Corrective action is applied to the final control element by relay 150 to increase the rate of flow by operation of contact 151, which in turn controls operation of output relay 152. The function of relay 152 corresponds to the operation of relay 110 but controls movement of final control motor 20 in the opposite direction to open valve 17, when contacts 155 and 156 are closed. The second passage of a particle between locations 23 and 24, requiring longer than the desired time, results in the operation of relay 150, which also closes a contact 160 to energize the latch tripping relay 165 from line 103 to release the armature of relay 145. It will be noted in this regard that relay 150 is energized in response to a short pulse of D.C. current produced by momentary closure of contact 70, which simultaneously re-energizes the coil of relay 145. In order to provide an effective circuit for the re-setting of relay 145, a holding circuit for tripping coil 165 is provided by condenser 166 and rectifier 167 which serve to hold contact 160 closed for a fraction of a second after the energizing pulse has been removed from the coils of both relays 145 and 150.

A similar circuit is provided for the resetting of relay 92 in response to a signal requiring closing of valve 17. As shown, the coil of relay 98 is shunted by condenser 170 which operates with rectifier 171 to hold closed the energizing circuit of tripping relay 102 to permit release of latch 96 for relay 92.

It will be recalled from the foregoing description that an energizing circuit for tripping relay 102 is also provided in accordance with the present invention when relay 92 is locked in by the occurrence of a measured time interval longer, rather than shorter, than the desired value for the rate of catalyst flow in the system. This tripping circuit for relay 92 is provided alternatively by contacts 97 and 181 or by the combination of contacts 140 and 180. If the passage of a second radioactive bead between 23 and 24 requires a longer time than was required for the closure of contact 81 by timing means TD-2, trip coil 102 is energized through contacts 140 and 180. However, if the time is sufficiently long, the subsequent closure of contact 84 by timing means TD-3 results in closure of contacts 97 and 181.

A similar arrangement for operation of tripping relay 165 is provided through contacts 94 and 182 or, alternatively, by contacts 183 and 184. Operation of this tripping coil by these two alternative circuits is made in response to the passage of a radio-active particle between locations 23 and 24 in a time less than the predeterminable value for the desired flow rate after the passage of a radioactive particle requiring a longer time for passage than the predetermined value.

Rectifiers 171 and 167 in their respective circuits additionally perform a highly useful function in that they provide a delay action when the respective memory circuit relays 92 and 145 are energized by an initial signal in response to a need for corrective action. Without these rectifiers, relays 92 and 147 could be automatically tripped by closing of coils 102 and 165, respectively, by the same signal which initially energizes and latches the memory circuit relays closed.

It will be understood from the description of the foregoing circuits that a corrective action in either a positive or negative direction, corresponding to movement of material being too slow or too fast, is made only after two consecutive time cycles have been measured with both cycles requiring correction in the same direction. Thus, if the successive time cycles are alternatively too slow and too fast, no corrective action is made on valve 17, but if two successive time cycles are too slow, then valve 17 is opened, or if the two successive cycles are too fast, valve 17 is closed.

From the foregoing description, it will be seen that there has been provided a flow control system for solid particulate material which is capable of automatically controlling the rate of flow of said material at a predetermined value in response to the passage of randomly-spaced radioactive particles flowing with the bulk of the solid material, said system being responsive to the passage of only those particles flowing substantially at the same rate as the bulk of the material and with adequate recognition of the occurrence of the source of radiation at the detectors in avoidance of signals which would be capable of producing an erroneous output from the control system which would upset the controlled variable rate of flow.

While, in the present embodiment, control of the final control element is preferably made in steps of predetermined magnitude, such control may be made in accordance with the degree of departure of the rate of flow from the desired value. The only requirement of such a system is that the rate of repetition of the signal-producing particles through the system is sufficiently fast to permit this mode of control.

While various modifications and changes in the foregoing system will become apparent to those skilled in the art from the foregoing detailed description, all such modifications and changes which fall within the scope of the appended claims are intended to be included therein.

I claim:

1. A control system for maintaining the rate of flow of solid particulate material in a continuously recirculating flow path at a predetermined value comprising means for establishing a preselectable time interval corresponding to said predetermined value of said flow rate for the continuously recirculating solid particulate material between two locations in said flow path, measuring means for determining the actual flow rate of said continuously recirculating material between said two locations in said flow path, said measuring means including time measuring means for determining the time interval for flow of at least one radioactivated particle between said two locations, a final control element for adjusting the rate of flow of said material through said recirculating path, and means responsive to the deviation of said time interval from said preselectable time interval for adjusting said final control element in a direction to return said rate of flow to said predetermined value in accordance with the deviation of the measured time interval for passage of said particle between said two locations from said preselectable time interval corresponding to the value of said predetermined rate of flow.

2. A control system for maintaining the rate of flow of solid particulate material in a continuously recirculating flow path at a predetermined value comprising measuring means for determining the actual rate of flow including means for detecting the arrival of at least one radioactivated particle of said continuously recirculating material at two separated locations in said flow path and time-interval measuring means for establishing the actual time required for passage of said radioactivated particle between said locations, means for establishing a preselectable time interval corresponding to said predetermined value of said rate of flow between said locations, a final control element for adjusting the rate of flow of said recirculating material through said path, and means responsive to said time interval measuring means for adjusting said final control element in a direction and to an extent to return said rate of flow to said predetermined value in accordance with the deviation of the measured time interval for passage of said particle between said two locations from said preselectable time interval corresponding to the value of said predetermined rate of flow.

3. A flow control system for maintaining the rate of flow of solid particulate material at substantially a constant value comprising radiation detecting means positioned at a pair of spaced locations along the flow path of said material, means responsive to the arrival of a radioactive particle traveling with the mass of said solid particulate material at the first of said spaced locations for initiating a timing cycle, means for terminating said timing cycle upon arrival of said radioactive particle at the second of said spaced locations, means for interrupting said time cycle in response to activation of the radioactive detecting means at said second location at a time outside of a normal control time cycle for passage of one of said radioactive particles between said spaced locations, memory means operable in response to variations of a measured time cycle within said normal controlled time cycle, and means for adjusting a final control element in a direction to return the flow rate of said material to said predeterminable value in response to a second time cycle varying in the same direction away from said predeterminable value as the signal stored in said memory means.

4. Apparatus for controlling the rate of flow of solid particulate material through a flow path comprising first detector means responsive to the arrival of a radioactive particle at a first location along sid flow path for initiating the operation of timing cycle means, second detector means responsive to the arrival of a radioactive particle at a second location along said flow path for terminating operation of said timing cycle means, means responsive to the initiation of said timing cycle to interrupt the measurement of said cycle upon arrival of a radioactive particle at said second location at times substantially different from the preselected value for said timing cycle corresponding to the desired value for said rate of flow, memory means operable in response to passage of a first radioactive particle between said two locations during a time cycle to establish the direction of corrective action required to maintain the controlled variable at its preselected value, and final control means operable in response to the passage of a second radioactive particle in a time cycle varying in the same direction as that measured by said memory means.

References Cited in the file of this patent

UNITED STATES PATENTS

| | | |
|---|---|---|
| 1,971,716 | Hitchcock | Aug. 28, 1934 |
| 2,453,456 | Piety | Nov. 9, 1948 |
| 2,491,445 | Cunningham | Dec. 13, 1949 |
| 2,529,583 | Adams | Nov. 14, 1950 |
| 2,571,277 | Morrow | Aug. 16, 1951 |
| 2,613,832 | Ogorzaly | Oct. 14, 1952 |
| 2,616,521 | Berg | Nov. 5, 1952 |
| 2,617,941 | Craggs | Nov. 11, 1952 |
| 2,631,242 | Metcalf | Mar. 10, 1953 |
| 2,640,936 | Pajes | June 2, 1953 |